US010196507B2

(12) United States Patent
Grestenberger et al.

(10) Patent No.: US 10,196,507 B2
(45) Date of Patent: Feb. 5, 2019

(54) HETEROPHASIC COMPOSITION

(71) Applicant: BOREALIS AG, Vienna (AT)

(72) Inventors: Georg Grestenberger, St. Peter in der Au (AT); Susanne Kahlen, Leonding (AT); Martina Sandholzer, Linz (AT); Gregory Potter, Pasching (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 15/765,949

(22) PCT Filed: Oct. 21, 2016

(86) PCT No.: PCT/EP2016/075304
§ 371 (c)(1),
(2) Date: Apr. 4, 2018

(87) PCT Pub. No.: WO2017/068088
PCT Pub. Date: Apr. 27, 2017

(65) Prior Publication Data
US 2018/0298171 A1     Oct. 18, 2018

(30) Foreign Application Priority Data

Oct. 23, 2015 (EP) .................................. 15191181

(51) Int. Cl.
*C08L 23/12* (2006.01)
*C08F 210/16* (2006.01)
(52) U.S. Cl.
CPC ............ *C08L 23/12* (2013.01); *C08F 210/16* (2013.01); *C08L 2205/025* (2013.01); *C08L 2205/035* (2013.01); *C08L 2207/02* (2013.01); *C08L 2312/02* (2013.01)
(58) Field of Classification Search
CPC ............... C08L 23/12; C08L 2205/025; C08L 2205/035; C08L 2207/02
USPC ........................................................ 524/451
See application file for complete search history.

(56) References Cited

U.S. PATENT DOCUMENTS

| | | | |
|---|---|---|---|
| 5,272,236 A | 12/1993 | Lai et al. | |
| 5,552,482 A | 9/1996 | Berta | |
| 2008/0287597 A1* | 11/2008 | Pham ...................... | C08L 23/10 524/525 |
| 2012/0190784 A1* | 7/2012 | Posch ................... | C08F 210/06 524/427 |
| 2015/0045479 A1 | 2/2015 | Yang | |

FOREIGN PATENT DOCUMENTS

| | | |
|---|---|---|
| EP | 0 491 566 | 6/1992 |
| EP | 586390 | 3/1994 |
| EP | 591224 | 4/1994 |
| EP | 0887379 | 12/1998 |
| EP | 2000506 | 12/2008 |
| EP | 2927274 | 10/2015 |
| WO | WO8707620 | 12/1987 |
| WO | 92/12182 | 12/1991 |
| WO | 92/19658 | 11/1992 |
| WO | WO92/19653 | 11/1992 |
| WO | 99/24478 | 5/1999 |
| WO | 99/24479 | 11/1999 |
| WO | 00/68315 | 5/2000 |
| WO | WO0228958 | 4/2002 |
| WO | 2004/000899 | 6/2002 |
| WO | 2004/111095 | 12/2004 |
| WO | WO2010108866 | 9/2010 |
| WO | 2010149529 | 12/2010 |

OTHER PUBLICATIONS

Busico, et al., "Alk-1-ene Polymerization in the Presence of a Monocyclopentadienyl Zirconium(iv) Acetamidinate Catalyst: Microstructural and Mechanistic Insightsa," Macromolecular Journals, 2007, vol. 28, pp. 1128-1134, Wiley-VCH Verlag GmbH & Co. KGaA, Weinheim.
Cheng, H.N., "C NMR Analysis of Ethylene-Propylene Rubbers," Macromolecules, 1984, vol. 17, No. 10, pp. 1950-1955, American Chemical Society.
European Search Report for Application No. 151911815.5-1302 dated Apr. 22, 2016, 6 pgs.
Resconi, et al., "Selectivity in Propene Polymerization with Metallocene Catalysts," Chemical Reviews, 2000, vol. 100, pp. 1253-1345, American Chemical Society.
Wang, et al., "Structural Analysis of Ethylene/Propylene Copolymers Synthesized with a Constrained Geometry Catalyst," Macromolecules, 2000, vol. 33, pp. 1157-1162, American Chemical Society.
Zhou, et al., "A new decoupling method for accurate quantification of polyethylene copolymer composition and triad sequence distribution with 13C NMR," Journal of Magnetic Resonance, 2007, vol. 187, pp. 225-233, Elsevier.
Kakugo, et al., "C NMR Determination of Monomer Sequence Distribution in Ethylene-Propylene Copolymers Prepared with s-TiCL13-AL (C2H5)2C1," Macromolecules, vol. 15, 1982, pp. 1150-1152, American Chemical Society.
Singh, et al., Triad Sequence Determination of Ethylene-Propylene Copolymers—Application of Quantitative 13C NMR, Polymer Testing, 29, 2009, pp. 475-479.
Sybille et al. "New Measurement Method for Appearance of Flow Marks or Tiger Stripes Defect for Improved Quantification and Analysis", PPS 25 Intern. Conf. Poly. Proc. SOC 2009 or Proceedings of the SPIE, vol. 6831, pp. 68130T-68130T-8 (2008).
Written Opinion of the International Preliminary Examining Authority for Application No. PCT/EP2016/075304 dated Sep. 11, 2017, 4 pgs.
European Search Report for Application No. PCT/EP2016/075304 dated Dec. 8, 2016, 10 pgs.
Notification of Transmittal of the International Preliminary Report on Patentability for Application No. PCT/EP2016/075304 dated Mar. 1, 2018, 18 pgs.
Zweifel, H., "Plastic Additives Handbook," 5th edition, 2001, pp. 966-990, Hanser Publishers, Munich.
Zweifel, H., "Plastics Additives Handbook," 6th Edition, 2009, pp. 1140-1191, Hanser Publishers, Munich.

\* cited by examiner

*Primary Examiner* — Hui H Chin
(74) *Attorney, Agent, or Firm* — Lowenstein Sandler LLP

(57) ABSTRACT

Modified heterophasic composition to improve the surface appearance of automobil parts.

15 Claims, No Drawings

HETEROPHASIC COMPOSITION

CROSS-REFERENCE TO RELATED APPLICATION(S)

This application is a national phase of International Application No. PCT/EP2016/075304, filed on Oct. 21, 2016, which claims the benefit of European Patent Application No. 15191181.5, filed on Oct. 23, 2015. The contents of these applications are hereby incorporated by reference in their entirety.

The present invention is directed to a new composition comprising a heterophasic composition, inorganic filler as well as a modified heterophasic composition as well as to an article made from said composition. The invention is further directed to the use of the modified heterophasic composition to reduce the tigerskin of a composition comprising polypropylene and said modified heterophasic composition.

Heterophasic systems are widely used in the automobile industry, especially for bumper applications, since they combine good stiffness with improved impact strength behavior. A heterophasic polymer composition comprises an at least partly crystalline matrix and an amorphous phase dispersed therein. The matrix is usually a propylene polymer and the amorphous phase a propylene copolymer rubber.

Automotive compounds comprising polypropylene are most commonly injection molding articles, whereupon tigerskin is a common problem regarding the appearance of exterior as well as interior parts. It can be observed as a repetitive change of surface gloss that looks like tigerskin which is a result of critical injection molding conditions, e.g. fast injection speed. The degree of tigerskin is usually measured by visual inspection and can be quantified by determination of the Mean Square Error (MSE) value which is proportional to the degree of tigerskin, i.e. high MSE values represent high degrees of tigerskin.

To reduce the effect of tigerskin moldability modifiers have been added in the past.

In EP 2 000 506 A1 the modifier for an injection molded composition is a composition of two different heterophasic systems. Both systems differ inter alia essentially in the melt flow rate, especially in view of the matrix. In other words the approach of this patent application is to reduce tigerskin by the creation of a bimodal matrix in a heterophasic system.

As similar approach is pursued in WO 02/28958 A2. Also in this patent application a modifier is described based on a heterophasic system containing a bimodal matrix.

In WO 2010/108866 A1 a modifier for an injection molded system is suggested. This modifier is especially featured by a rather high intrinsic viscosity of the elastomeric phase, i.e. in the range of 5 to 9 dl/g.

Since the problem of tigerskin could not be solved in the past satisfactorily, it is an object of the present invention to provide a polymer composition which can be injection molded to obtain automotive compounds showing reduced tigerskin, by keeping the mechanical properties on a high level.

Accordingly, the present invention relates to a polymer composition comprising
(a) a heterophasic composition (HECO) comprising
    (a1) a (semi)crystalline polypropylene (PP) and
    (a2) an elastomeric propylene copolymer (ESC) dispersed in said (semi)crystalline polypropylene (PP);
(b) an inorganic filler (F), and
(c) a modified heterophasic composition (mHECO) comprising
    (c1) a (semi)crystalline polypropylene (mPP);
    (c2) an elastomeric propylene copolymer (mESC) dispersed in said (semi)crystalline polypropylene (mPP); and
    (c3) units (D) derived from bifunctionally unsaturated monomer(s) (D') and/or multifunctionally unsaturated low molecular weight polymer(s) (D").

The present invention is especially directed to a composition comprising
(a) a heterophasic composition (HECO) comprising
    (a1) a (semi)crystalline polypropylene (PP) and
    (a2) an elastomeric propylene copolymer (ESC) dispersed in said (semi)crystalline polypropylene (PP);
(b) an inorganic filler (F), and
(c) a modified heterophasic composition (mHECO) comprising
    (c1) a (semi)crystalline polypropylene (mPP);
    (c2) an elastomeric propylene copolymer (mESC) dispersed in said (semi)crystalline polypropylene (mPP); and
    (c3) units (D) derived from bifunctionally unsaturated monomer(s) (D') selected from the group consisting of divinyl compounds, allyl compounds, and dienes, and/or multifunctionally unsaturated low molecular weight polymer (D") being a polybutadiene or a copolymer of polybutadiene and styrene having 1,2-(vinyl) in the polymer chain and having a number average molecular weight (Mn) of equal or below 10000 g/mol.

Preferably the heterophasic composition (HECO) is different to the modified heterophasic composition (mHECO), and/or the heterophasic composition (HECO), the inorganic filler (F), and the modified heterophasic composition (mHECO) make up together at least 90 wt.-%, based on the total weight of the composition, of the composition.

More preferably the present invention is directed to a composition comprising
(a) 45 to 85 wt.-%, based on the total weight of the composition, of a heterophasic composition (HECO) comprising
    (a1) a (semi)crystalline polypropylene (PP) and
    (a2) an elastomeric propylene copolymer (ESC) dispersed in said (semi)crystalline polypropylene (PP);
(b) 5 to 25 wt.-%, based on the total weight of the composition, of the inorganic filler (F); and
(c) 5 to 30 wt.-%, based on the total weight of the composition, of a modified heterophasic composition (mHECO) comprising
    (c1) a (semi)crystalline polypropylene (mPP);
    (c2) an elastomeric propylene copolymer (mESC) dispersed in said (semi)crystalline polypropylene (mPP); and
    (c3) units (D) derived from bifunctionally unsaturated monomer(s) (D') and/or multifunctionally unsaturated low molecular weight polymer(s) (D").

Preferably the modified heterophasic composition (mHECO) comprises at least 0.1 wt.-% of units (D), e.g. units derived from bifunctionally unsaturated monomers (D') and/or multifunctionally unsaturated low molecular weight polymers (D").

Preferably the bifunctionally unsaturated monomers (D') used for the units (D) are selected from the group consisting of divinyl compounds, allyl compounds and dienes, more preferably the bifunctionally unsaturated monomers (D') used for the units (D) are selected from the group consisting of 1,3-butadiene, isoprene, dimethylbutadiene, and divinylbenzene. Further it is preferred that the multifunctionally unsaturated low molecular weight polymer (D") has a number average molecular weight (Mn) of equal or below 10000 g/mol, more preferably the multifunctionally unsaturated low molecular weight polymer (D″) is a polybutadiene having a number average molecular weight (Mn) of equal or below 10000 g/mol.

Preferably the modified heterophasic composition (mHECO) has a xylene soluble fraction (XCS) in the range of 15 to 30 wt.-% and/or a gel content of below 1.0 wt.-%.

Additionally or alternatively to the previous paragraph the intrinsic viscosity (IV) of the xylene soluble fraction (XCS) of the modified heterophasic composition (mHECO) is in the range of 1.5 to 2.6 dl/g.

More preferably the modified heterophasic composition (mHECO) has a melt flow rate $MFR_2$ (230° C.) measured according to ISO 1133 from 20 to 50 g/10 min.

In a specific embodiment the modified heterophasic composition (mHECO) has a comonomer content, based on the total weight of the modified heterophasic composition (mHECO), in the range of 12 to 28 mol.-%.

It is further preferred that the heterophasic composition (HECO) has a comonomer content, based on the total weight of the heterophasic composition (HECO), in the range of 10 to 30 mol-% and/or a xylene soluble fraction (XCS) in the range of 20 to 45 wt.-% and/or a melt flow rate $MFR_2$ (230° C.) measured according to ISO 1133 from 5 to 30 g/10 min.

In a specific embodiment the xylene soluble fraction (XCS) of the heterophasic composition (HECO) has an intrinsic viscosity (IV) in the range of 1.5 to 4.5 dl/g and/or a comonomer content, based on the total weight of the xylene soluble fraction (XCS) of the heterophasic composition (HECO), in the range of 30 to 60 mol.-%.

In an especially preferred embodiment the xylene insoluble fraction (XCI) of the heterophasic composition (HECO) has an intrinsic viscosity (IV) in the range of 0.8 to 1.8 dl/g and/or the ratio of the intrinsic viscosity (IV) of the xylene soluble fraction (XCS) of the heterophasic composition (HECO) to the intrinsic viscosity (IV) of the xylene insoluble fraction (XCI) of the heterophasic composition (HECO) [IV(XCS)/IV(XCI)] is in the range of 0.5 to 5.8.

Additionally it is preferred that the inorganic filler (F) is talc.

The invention is also directed to an article, preferably to an automotive article, comprising the composition of the present invention.

Additionally the invention is directed to the use of the modified heterophasic composition (mHECO) as defined herein to reduce tigerskin of a composition comprising said modified heterophasic composition (mHECO) and a polypropylene (P) different to the modified heterophasic composition (mHECO). More preferably the polypropylene (P) is the heterophasic composition (HECO) as defined herein. It is additionally preferred that the composition comprises in addition the modified heterophasic composition (mHECO) and the polypropylene (P), like the heterophasic composition (HECO), an inorganic filler (F), e.g. talc. Typically the modified heterophasic composition (mHECO) is present in the composition to reduce effectively the tigerskin in an amount in the range of 10 to 30 wt.-%, based on the total weight of the composition. Thus it is especially preferred that the reduction of tigerskin is accomplished in a composition comprising (a1) 45 to 85 wt.-%, based on the total weight of the composition, of the heterophasic composition (HECO);

(a2) 5 to 25 wt.-%, based on the total weight of the composition, of the inorganic filler (F); and (a3) 5 to 30 wt.-%, based on the total weight of the composition, of the modified heterophasic composition (mHECO).

In an especially preferred embodiment, the reduction of tigerskin is accomplished in case of MSE values equal or below 30.

The invention will be now described in more detail.

The Composition

The composition of the present invention must comprise the heterophasic composition (HECO), the inorganic filler (F), and the modified heterophasic composition (mHECO). In addition the composition may comprise alpha nucleating agents (NU) and additives (AD). Accordingly it is preferred that the heterophasic composition (HECO), the inorganic filler (F), and the modified heterophasic composition (mHECO) make up together at least 80 wt.-%, more preferably at least 85 wt.-%, yet more preferably at least 90 wt.-%, like at least 95 wt.-%, based on the total weight of the composition, of the composition.

Accordingly in one specific embodiment the composition consists of the heterophasic composition (HECO), the inorganic filler (F), and the modified heterophasic composition (mHECO) and the optional alpha nucleating agents (NU) and/or additives (AD).

Preferably the weight ratio between the heterophasic composition (HECO) and the modified heterophasic composition (mHECO) [(HECO)/(mHECO)] is in the range of 1.5 to 10, more preferably in the range of 2.0 to 8.0, more preferably in the range of 2.5 to 6.0.

Accordingly it is preferred that the composition of the present invention comprises (a) 45 to 85 wt.-%, more preferably in the range of 50 to 82 wt.-%, still more preferably in the range of 55 to 80 wt.-%, like in the range of 60 to 78 wt.-%, based on the total weight of the composition, of the heterophasic composition (HECO);

(b) 5 to 25 wt.-%, 5 to 22 wt.-%, still more preferably in the range of 6 to 20 wt.-%, like in the range of 7 to 18 wt.-%, based on the total weight of the composition, of the inorganic filler (F); and (c) 5 to 30 wt.-%, more preferably in the range of 7 to 25 wt.-%, still more preferably in the range of 14 to 22 wt.-%, like in the range of 18 to 22 wt.-%, based on the total weight of the composition, of the modified heterophasic composition (mHECO).

As mentioned above the composition may comprise in addition alpha-nucleating agents (NU) and/or additives (AD). According to this invention, the alpha nucleating agent (NU) nor the filler (F) is an additive (AD). Further, according to this invention the filler (F) is not an alpha nucleating agent (NU). Accordingly it is preferred that the composition contains up to 5.0 wt.-%, preferably $1.0 \times 10^{-5}$ to 4.0 wt.-%, more preferably $2.0 \times 10^{-5}$ to 2.0 wt.-%, based on the total weight of the composite, of alpha nucleating agents (NU) and/or up to 8.0 wt.-%, preferably 0.1 to 6.0 wt.-%, more preferably 0.5 to 4.0 wt.-%, based on the total weight of the composite, of additives (AD).

Therefore it is especially preferred that the composition consists of (a) 45 to 85 wt.-%, more preferably in the range of 50 to 82 wt.-%, still more preferably in the range of 55 to 80 wt.-%, like in the range of 60 to 78 wt.-%, based on the total weight of the composition, of the heterophasic composition (HECO);

(b) 5 to 25 wt.-%, 5 to 22 wt.-%, still more preferably in the range of 6 to 20 wt.-%, like in the range of 7 to 18 wt.-%, based on the total weight of the composition, of the inorganic filler (F);

(c) 5 to 30 wt.-%, more preferably in the range of 7 to 25 wt.-%, still more preferably in the range of 14 to 22 wt.-%, like in the range of 18 to 22 wt.-%, based on the total weight of the composition, of the modified heterophasic composition (mHECO);
(d) 1 to 18 wt.-% preferably 2 to 16 wt. %, based on the total weight of the composition, of an elastomer (E);
(e) optionally up to 5.0 wt.-%, preferably $1.0 \times 10^{-5}$ to 4.0 wt.-%, more preferably $2.0 \times 10^{-5}$ to 2.0 wt.-% based on the total weight of the composite, of alpha nucleating agents (NU); and
(f) optionally up to 8.0 wt.-%, preferably 0.1 to 6.0 wt.-%, more preferably 0.5 to 4.0 wt.-%, based on the total weight of the composite, of additives (AD).

The elastomer (E) can be any elastomeric polyolefin with the proviso that it chemically differs from the elastomeric propylene copolymers (ESC) and (ESC1) as defined in the present invention. More preferably the elastomer (E) means herein a very low density polyolefin, more preferably very low density polyolefin polymerised using single site, preferably metallocene catalysis. Typically, the elastomer (E) is an ethylene copolymer. These elastomers (E) usually have a density of less than or equal to 0.910 g/cm$^3$, more suitably less than or equal to 0.905 g/cm$^3$. The density usually is above 0.860 g/cm$^3$, more suitably more than 0.880 g/cm$^3$. Preferable, the elastomer (E) has a melt flow rate MFR$_2$ (190° C., 2.16 kg), of less than about 50 g/10 min, suitably between 0.3 and 20 g/10 min and more suitably between 0.5 and 20 g/10 min.

In one preferred embodiment the elastomer (E) is prepared with at least one metallocene catalyst. The elastomer (E) may also be prepared with more than one metallocene catalyst or may be a blend of multiple elastomers prepared with different metallocene catalysts. In some embodiments, the elastomer (E) is a substantially linear ethylene polymer (SLEP). SLEPs and other metallocene catalysed elastomers (E) are known in the art, for example, U.S. Pat. No. 5,272,236. These resins are also commercially available, for example, as Queo™ plastomers available from Borealis, ENGAGE™ plastomer resins available from Dow Chemical Co. or EXACT™ polymers from Exxon or TAFMER™ polymers from Mitsui.

In one especially preferred embodiment the composition consists of
(a) 45 to 85 wt.-%, more preferably in the range of 50 to 82 wt.-%, still more preferably in the range of 55 to 80 wt.-%, like in the range of 60 to 78 wt.-%, based on the total weight of the composition, of the heterophasic composition (HECO);
(b) 5 to 25 wt.-%, 5 to 22 wt.-%, still more preferably in the range of 6 to 20 wt.-%, like in the range of 7 to 18 wt.-%, based on the total weight of the composition, of the inorganic filler (F);
(c) 5 to 30 wt.-%, more preferably in the range of 7 to 25 wt.-%, still more preferably in the range of 14 to 22 wt.-%, like in the range of 18 to 22 wt.-%, based on the total weight of the composition, of the modified heterophasic composition (mHECO);
(d) optionally up to 5.0 wt.-%, preferably $1.0 \times 10^{-5}$ to 4.0 wt.-%, more preferably $2.0 \times 10^{-5}$ to 2.0 wt.-% based on the total weight of the composite, of alpha nucleating agents (NU); and
(e) optionally up to 8.0 wt.-%, preferably 0.1 to 6.0 wt.-%, more preferably 0.5 to 4.0 wt.-%, based on the total weight of the composite, of additives (AD).

It is especially preferred that the composition has a melt flow rate MFR$_2$ (230° C., 2.16 kg) in the range of 1.0 to 30.0 g/10 min, more preferably in the range of 5.0 to 25.0 g/10 min, still more preferably in the range of 8.0 to 22.0 g/10 min, like in the range of 10.0 to 20.0 g/10 min.

Preferably the composition has a tensile modulus of at least 1200 MPa, more preferably in the range of 1200 to 2500 MPa, yet more preferably in the range of 1300 to 2100 MPa.

Additionally or alternatively to the previous paragraph the composite has
(a) a notched Charpy impact strength (23° C.) of at least 35.0 kJ/m$^2$, more preferably in the range of 35.0 to 58.0 kJ/m$^2$, like in the range of 38.0 to 55.0 kJ/m$^2$;
and/or
(b) a notched Charpy impact strength (−20° C.) of at least 4.8 kJ/m$^2$, more preferably in the range of 4.8 to 10.0 kJ/m$^2$, like in the range of 5.5 to 8.5 kJ/m$^2$.

The composition according to the invention may be pelletized and compounded using any of the variety of compounding and blending methods well known and commonly used in this filed.

In the following the individual components of the composite are defined in more detail.

The Heterophasic Composition (HECO)

The composition according to this invention must contain a heterophasic composition (HECO) comprising a (semi)crystalline polypropylene (PP) as a matrix in which an elastomeric propylene copolymer (ESC) is dispersed. The expression "heterophasic composition" or "heterophasic" as used in the instant invention indicates that the elastomeric propylene copolymer (ESC) is (finely) dispersed in the (semi)crystalline polypropylene (PP). In other words the (semi)crystalline polypropylene (PP) constitutes a matrix in which the elastomeric propylene copolymer (ESC) forms inclusions in the matrix, i.e. in the (semi)crystalline polypropylene (PP). Thus the matrix contains (finely) dispersed inclusions being not part of the matrix and said inclusions contain the elastomeric propylene copolymer (ESC). The term "inclusion" according to this invention shall preferably indicate that the matrix and the inclusion form different phases within the heterophasic composition (HECO), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic composition (HECO) has a melt flow rate MFR$_2$ (230° C., 2.16 kg) in the range of 5 to 30 g/10 min, more preferably in the range of 8 to 25 g/10 min, still more preferably in the range of 10 to 20 g/10 min.

As mentioned above, the heterophasic composition (HECO) according to this invention preferably comprises
(a) a (semi)crystalline polypropylene (PP) as the matrix (M) and
(b) an elastomeric propylene copolymer (ESC).

Preferably the weight ratio between the (semi)crystalline polypropylene (PP) and the elastomeric propylene copolymer (ESC) [PP/ESC] of the heterophasic composition (HECO) is in the range of 80/20 to 40/60, more preferably in the range of 75/35 to 45/55, yet more preferably in the range of 70/30 to 50/50, like in the range of 70/30 to 60/40.

Accordingly, the heterophasic composition (HECO) has a comonomer content, preferably a content of ethylene and/or C$_4$ to C$_{12}$ α-olefin, more preferably an ethylene content, of equal or below 30.0 mol.-%, more preferably in the range of 10.0 to 30.0 mol.-%, still more preferably in the range of 12.0 to 28.0 mol-%, yet more preferably in the range of 15.0 to 25.0 mol.-%.

Preferably the heterophasic composition (HECO) has a xylene cold soluble (XCS) fraction (25° C.) in the range of 20 to 45 wt.-%, more preferably in the range of 22 to 40 wt.-%, still more preferably in the range of 25 to 37 wt.-% and most preferably in the range of 28 to 35 wt. %.

Preferably the comonomer content, preferably the content of ethylene and/or $C_4$ to $C_{12}$ α-olefin, more preferably the content of ethylene, of the xylene cold soluble fraction (XCS) of the heterophasic composition (HECO) is in the range of 30.0 to 60.0 mol.-%, more preferably in the range of 35.0 to 58.0 mol.-%, still more preferably in the range of 40.0 to 55.0 mol.-%, yet more preferably in the range of 45.0 to 55.0 mol.-%, like 49.0 to 55.0 mol.-%.

In a preferred embodiment the intrinsic viscosity (IV) of the xylene cold soluble fraction (XCS) of the heterophasic composition (HECO) is above 1.5 dl/g, more preferably at least 1.7 dl/g. On the other hand the intrinsic viscosity (IV) should be not too high otherwise the flowability is decreased. Thus the intrinsic viscosity of xylene cold soluble fraction (XCS) of the heterophasic composition (HECO) is preferably in the range of 1.5 to 4.5 dl/g, more preferably in the range 1.7 to 4.0 dl/g and even more preferably in the range of 1.8 to 3.5 dl/g. In a very specific embodiment the the intrinsic viscosity (IV) of the xylene cold soluble fraction (XCS) of the heterophasic composition (HECO) is in the range of 1.5 to to 3.0 dl/g, more preferably in the range of 1.8 to 2.8, like in the range of 1.8 to 2.5 dl/g.

Further it is preferred that the xylene insoluble fraction (XCI) of the heterophasic composition (HECO) has an intrinsic viscosity (IV) in the range of 0.8 to 1.8 dl/g, more preferably in the range of 0.9 to 1.7 dl/g, still more preferably in the range of 1.0 to 1.6 dl/g.

Accordingly it is especially preferred that the ratio of the intrinsic viscosity (IV) of the xylene soluble fraction (XCS) of the heterophasic composition (HECO) to the intrinsic viscosity (IV) of the xylene insoluble fraction (XCI) of the heterophasic composition (HECO) [IV(XCS)/IC(XCI)] is in the range of 0.5 to 5.8, more preferably in the range of 1.0 to 2.0, yet more preferably in the range of 1.1 to 1.8, like in the range of 1.2 to 1.5.

The (semi)crystalline polypropylene (PP) is preferably a (semi)crystalline random propylene copolymer (R-PP) or a (semi)crystalline propylene homopolymer (H-PP), the latter especially preferred.

The expression "propylene homopolymer" used in the instant invention relates to a polypropylene that consists substantially, i.e. of more than 99.70 mol-%, still more preferably of at least 99.80 mol-%, of propylene units. In a preferred embodiment only propylene units in the propylene homopolymer are detectable.

In case the (semi)crystalline polypropylene (PP) is a (semicrystalline) random propylene copolymer (R-PP) it is appreciated that the (semi)crystalline random propylene copolymer (R-PP) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semi)crystalline random propylene copolymer (R-PP) according to this invention comprises, especially consists of, monomers co-polymerizable with propylene from the group consisting of ethylene, 1-butene and 1-hexene. More specifically the (semi)crystalline random propylene copolymer (R-PP) of this invention comprises—apart from propylene—units derivable from ethylene and/or 1-butene. In a preferred embodiment the (semi)crystalline random propylene copolymer (R-PP) comprises units derivable from ethylene and propylene only.

Additionally it is appreciated that the (semicrystalline) random propylene copolymer (R-PP) has preferably a co-monomer content in the range of more than 0.30 to 3.0 mol-%, more preferably in the range of more than 0.35 to 2.5 mol-%, yet more preferably in the range of 0.40 to 2.0 mol-%.

The term "random" indicates in the present invention that the co-monomers of the (semi)crystalline random propylene copolymers are randomly distributed within the propylene copolymer. The term random is understood according to IUPAC (Glossary of basic terms in polymer science; IUPAC recommendations 1996).

As will be explained below, the heterophasic composition (HECO) can be produced by blending the (semi)crystalline polypropylene (PP) and the elastomeric propylene copolymer (EC). However, it is preferred that the heterophasic composition (HECO) is produced in a sequential step process, using reactors in serial configuration and operating at different reaction conditions. Typically the (semi)crystalline polypropylene (PP) is produced in at least one first reactor and subsequently the elastomeric propylene copolymer (EC) in at least one second reactor.

Further it is appreciated that the (semi)crystalline polypropylene (PP), like (semi)crystalline propylene homopolymer (H-PP), has a melt flow rate $MFR_2$ (230° C.) measured according to ISO 1133 of 15 to 180 g/10 min, more preferably of 20 to 150 g/10 min, still more preferably of 25 to 100 g/10 min, still more preferably of 30 to 45 g/10 min.

The term "(semi)crystalline" indicates in the present invention that the polymer is not amorphous. Accordingly it is preferred that the (semi)crystalline polypropylene (PP) according to this invention has a xylene soluble fraction (XCS) of not more than 10 wt.-%, in case of a (semi)crystalline propylene homopolymer (H-PP) the xylene soluble fraction (XCS) is even lower, i.e. not more than 6.0 wt, more preferably not more than 4.5 wt.-%, like not more than 3.5 wt.-%.

Accordingly it is preferred that the (semi)crystalline propylene homopolymer (H-PP) has a xylene soluble fraction (XCS) of below 5.0 wt.-%, more preferably in the range of 0.5 to 4.5, like in the range of 1.0 to 3.5 wt.-%.

The second component of the heterophasic composition (HECO) is the elastomeric propylene copolymer (ESC).

Preferably said elastomeric propylene copolymer (EC) comprises units derived from
propylene and
ethylene and/or $C_4$ to $C_{12}$ α-olefin.

The elastomeric propylene copolymer (ESC) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. The elastomeric propylene copolymer (ESC) may additionally contain units derived from a conjugated diene, like butadiene, or a non-conjugated diene, however it is preferred that the elastomeric propylene copolymer (ESC) consists of units derivable from (i) propylene and (ii) ethylene and/or $C_4$ to $C_{12}$ α-olefins only. Suitable non-conjugated dienes, if used, include straight-chain and branched-chain acyclic dienes, such as 1,4-hexadiene, 1,5-hexadiene, 1,6-octadiene, 5-methyl-1,4-hexadiene, 3,7-dimethyl-1,6-octadiene, 3,7-dimethyl-1,7-octadiene, and the mixed isomers of dihydromyrcene and dihydro-ocimene, and single ring alicyclic dienes such as 1,4-cyclohexadiene, 1,5-cyclooctadiene, 1,5-cyclododecadiene, 4-vinyl cyclohexene, 1-allyl-4-isopropylidene cyclohexane, 3-allyl cyclopentene, 4-cyclohexene and 1-isopropenyl-4-(4-butenyl) cyclohexane.

Accordingly the elastomeric propylene copolymer (ESC) comprises at least units derivable from propylene and ethylene and may comprise other units derivable from a further α-olefin as defined in the previous paragraph. However, it is in particular preferred that elastomeric propylene copolymer (ESC) comprises units only derivable from propylene and ethylene and optionally a conjugated diene, like butadiene, or a non-conjugated diene as defined in the previous paragraph, like 1,4-hexadiene. Thus an ethylene propylene non-conjugated diene monomer polymer (EPDM) and/or an ethylene propylene rubber (EPR) as elastomeric propylene copolymer (ESC) is especially preferred, the latter most preferred.

Preferably the comonomer content, like the ethylene content, of the elastomeric propylene copolymer (ESC) is in the range of 40.0 to 78 mol.-%, more preferably in the range of 50.0 to 75.0 mol.-%, still more preferably in the range of 55.0 to 72.0 mol-%, yet more preferably in the range of 60.0 to 70.0 mol.-%. The calculation of the comonomer content of the elastomeric propylene copolymer (ESC) is defined in the example section.

As mentioned above the heterophasic composition (HECO) can be produced by blending the (semi)crystalline polypropylene (PP) and the elastomeric propylene copolymer (ESC). However, it is preferred that the heterophasic composition (HECO) is produced in a sequential step process, using reactors in serial configuration and operating at different reaction conditions. As a consequence, each fraction prepared in a specific reactor may have its own molecular weight distribution and/or comonomer content distribution.

The heterophasic composition (HECO) according to this invention is preferably produced in a sequential polymerization process, i.e. in a multistage process, known in the art, wherein the (semi)crystalline polypropylene (PP) is produced at least in one slurry reactor, preferably in a slurry reactor and optionally in a subsequent gas phase reactor, and subsequently the elastomeric propylene copolymer (ESC) is produced at least in one, i.e. one or two, gas phase reactor(s).

Accordingly it is preferred that the heterophasic composition (HECO) is produced in a sequential polymerization process comprising the steps of
(a) polymerizing propylene and optionally at least one ethylene and/or $C_4$ to $C_{12}$ α-olefin in a first reactor (R1) obtaining the first polypropylene fraction of the (semi)crystalline polypropylene (PP), preferably said first polypropylene fraction is a propylene homopolymer,
(b) transferring the first polypropylene fraction into a second reactor (R2),
(c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semi)crystalline polypropylene (PP), i.e. the matrix of the heterophasic composition (HECO),
(d) transferring the (semi)crystalline polypropylene (PP) of step (c) into a third reactor (R3),
(e) polymerizing in the third reactor (R3) and in the presence of the (semi)crystalline polypropylene (PP) obtained in step (c) propylene and at least one ethylene and/or $C_4$ to $C_{12}$ α-olefin obtaining thereby the elastomeric propylene copolymer (EC), said elastomeric propylene copolymer (ESC) is dispersed in the (semi)crystalline polypropylene (PP); accordingly the (semi)crystalline polypropylene (PP) and the elastomeric propylene copolymer (ESC) form the heterophasic composition (HECO).

Of course, in the first reactor (R1) the second polypropylene fraction can be produced and in the second reactor (R2) the first polypropylene fraction can be obtained.

Preferably between the second reactor (R2) and the third reactor (R3) the monomers are flashed out.

Of course also the elastomeric propylene copolymer (ESC) can be produced in two reactors, like the (semi)crystalline polypropylene (PP).

The term "sequential polymerization process" indicates that the heterophasic composition (HECO) is produced in at least two, like three or four reactors connected in series. Accordingly the present process comprises at least a first reactor (R1) and a second reactor (R2), more preferably a first reactor (R1), a second reactor (R2) and a third reactor (R3) or in a first reactor (R1), a second reactor (R2), a third reactor (R3) and fourth reactor (R4). The term "polymerization reactor" shall indicate that the main polymerization takes place. Thus in case the process consists of three or four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic composition (HECO) as defined above the conditions for the first reactor (R1), i.e. the slurry reactor (SR), like a loop reactor (LR), of step (a) may be as follows:

the temperature is within the range of 50° C. to 110° C., preferably between 60° C. and 100° C., more preferably between 68 and 95° C., the pressure is within the range of 20 bar to 80 bar, preferably between 40 bar to 70 bar, hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3), preferably in the second gas phase reactor (GPR-2), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic composition (HECO) is obtained by a multistage polymerization process, as described above, in the presence of a catalyst system comprising as component (i) a Ziegler-Natta procatalyst. Preferably said Ziegler-Natta procatalyst is the catalyst ZN104 commercially available from Basell.

As component (ii) preferably an organometallic cocatalyst is used. Preferably the organometallic cocatalyst is selected from the group consisting of trialkylaluminum, like triethylaluminium (TEA), dialkyl aluminium chloride and alkyl aluminium sesquichloride.

Component (iii) of the catalysts system used is an external donor represented by formula (IIIa) or (Mb). Formula (IIIa) is defined by $$Si(OCH_3)_2R_2^5 \tag{IIIa}$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (Mb) is defined by $$Si(OCH_2CH_3)_3(NR^xR^y) \tag{IIIb}$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [Si(OCH$_3$)$_2$(cyclopentyl)$_2$], diisopropyl dimethoxy silane [Si(OCH$_3$)$_2$(CH(CH$_3$)$_2$)$_2$].

Most preferably the external donor is dicyclopentyl dimethoxy silane [Si(OCH$_3$)$_2$(cyclo-pentyl)$_2$].

The Modified Heterophasic Composition (mHECO)

An essential component of the present invention is the modified heterophasic composition (mHECO). As can be taken from the wording "modified" the modified heterophasic composition (mHECO) is a heterophasic composition which has been further chemically treated. In the present case the modified heterophasic composition (mHECO) is a heterophasic composition which has been chemically modified via incorporation of bifunctionally unsaturated monomer(s) (D') and/or at least multifunctionally unsaturated low molecular weight polymer(s) (D"). In other words bifunctionally unsaturated monomer(s) (D') and/or at least multifunctionally unsaturated low molecular weight polymer(s) (D") have been covalent coupled via chemical reaction, e.g. radical reaction, to the heterophasic composition and forming thereby the units (D) of the modified heterophasic composition (mHECO).

Accordingly the a modified heterophasic composition (mHECO) comprises
(a) a (semi)crystalline polypropylene (mPP);
(b) an elastomeric propylene copolymer (mESC) dispersed in said (semi)crystalline polypropylene (mPP); and (c) units (D) derived from bifunctionally unsaturated monomer(s) (D') and/or at least multifunctionally unsaturated low molecular weight polymer(s) (D").

Preferably the weight ratio between the (semi)crystalline polypropylene (mPP) and the elastomeric propylene copolymer (mESC) [mPP/mESC] of the modified heterophasic composition (mHECO) is in the range of 80/20 to 40/60, more preferably in the range of 75/35 to 45/55, yet more preferably in the range of 70/30 to 50/50, like in the range of 70/30 to 60/40.

Preferably, the modified heterophasic composition (mHECO) has a melt flow rate $MFR_2$ (230° C., 2.16 kg) in the range of 20 to 50 g/10 min, more preferably in the range of 23 to 45 g/10 min, still more preferably in the range of 26 to 40 g/10 min.

Accordingly, the modified heterophasic composition (mHECO) has a comonomer content, preferably a content of ethylene and/or $C_4$ to $C_{12}$ α-olefin, more preferably an ethylene content, of equal or below 30.0 mol.-%, more preferably in the range of 10.0 to 30.0 mol.-%, still more preferably in the range of 12.0 to 28.0 mol.-%, yet more preferably in the range of 15.0 to 25.0 mol.-%. The amount is measured on the heterophasic composition (HECO) to be modified, i.e. before the heterophasic composition (HECO) has been further chemically treated with the bifunctionally unsaturated monomer(s) (D') and/or at least multifunctionally unsaturated low molecular weight polymer(s) (D"), e.g. on the heterophasic composition (HECO1).

The comonomers of the modified heterophasic composition (mHECO) are the comonomers arising from an elastomeric propylene copolymer (mESC) and optionally in addition from the (semi)crystalline polypropylene (mPP). According to this invention the units (D) of the modified heterophasic composition (mHECO) are not be regarded as comonomers and discussed separately.

Preferably the modified heterophasic composition (mHECO) has a xylene cold soluble (XCS) fraction (25° C.) of at least 15 wt.-%. Accordingly it is preferred that the modified heterophasic composition (mHECO) has a xylene cold soluble (XCS) fraction (25° C.) in the range of 15 to 35 wt.-%, more preferably in the range of 15 to 30 wt.-%, still more preferably in the range of 18 to 28 wt.-%, like in the range of 20 to 26 wt. %.

In a preferred embodiment the intrinsic viscosity (IV) of the xylene cold soluble fraction (XCS) of the the modified heterophasic composition (mHECO) is below 3.0 dl/g, more preferably equal or below 2.6 dl/g. On the other hand the intrinsic viscosity (IV) should be not too high otherwise the flowability is decreased. Thus the intrinsic viscosity of xylene cold soluble fraction (XCS) of the modified heterophasic composition (mHECO) is preferably in the range of 1.3 to 2.8 dl/g, more preferably in the range 1.5 to 2.6 dl/g and even more preferably in the range of 1.8 to 2.3 dl/g.

Preferably the modified heterophasic composition (mHECO) is further and/or alternatively defined by the gel content. The gel content is a good indicator for the chemical modification of the modified heterophasic composition (mHECO). Accordingly the present invention is featured by a gel content of of below 1.0 wt.-%. More preferably the gel content is at least or more than 0.15 wt.-%, yet more preferably of at least 0.20 wt.-%. On the other hand the gel content shall be not too high otherwise other properties are negatively influenced. Thus the gel content is preferably below or not more than 0.80 wt.-%, even more preferred not more than 0.50 wt.-%, still more preferred does not exceed 0.40 wt.-% determined as the relative amount of polymer insoluble in boiling xylene (xylene hot insoluble fraction, XHI). Thus a preferred range for the gel content is 0.15 to 0.80 wt.-%, more preferred 0.18 to 0.60 wt.-%, like 0.18 to 0.35 wt.-%.

The (semi)crystalline polypropylene (mPP) of the modified heterophasic composition (mHECO) is preferably a (semi)crystalline random propylene copolymer (mR-PP) or a (semi)crystalline propylene homopolymer (mH-PP), the latter especially preferred.

In case the (semi)crystalline polypropylene (mPP) is a (semi)crystalline random propylene copolymer (mR-PP) it is appreciated that the (semi)crystalline random propylene copolymer (mR-PP) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene. Preferably the (semi)crystalline random propylene copolymer (mR-PP) according to this invention comprises, especially consists of, monomers co-polymerizable with propylene from the group consisting of ethylene, 1-butene and 1-hexene. More specifically the (semi)crystalline random propylene copolymer (mR-PP) of this invention comprises—apart from propylene—units derivable from ethylene and/or 1-butene. In a preferred embodiment the (semi)crystalline random propylene copolymer (mR-PP) comprises units derivable from ethylene and propylene only.

Additionally it is appreciated that the (semi)crystalline random propylene copolymer (mR-PP) has preferably a comonomer content in the range of more than 0.30 to 3.0 mol-%, more preferably in the range of more than 0.35 to 2.5 mol-%, yet more preferably in the range of 0.40 to 2.0 mol-%.

The second component of the modified heterophasic composition (mHECO) is the elastomeric propylene copolymer (mESC).

Preferably said elastomeric propylene copolymer (mESC) comprises units derived from
  propylene and
  ethylene and/or $C_4$ to $C_{12}$ α-olefin.

The elastomeric propylene copolymer (mESC) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. It is especially preferred that the elastomeric propylene copolymer (mESC) comprises at least units derivable from (i) propylene and (ii) ethylene or 1-butene. In one specific embodiment the elastomeric propylene copolymer (mESC) comprises units derivable from propylene and ethylene only.

The comonomer content, like the ethylene content, of the elastomeric propylene copolymer (mESC) of the modified heterophasic composition (mHECO) is in the range of 30.0 to 60 mol.-%, more preferably in the range of 35.0 to 58.0 mol.-%, still more preferably in the range of 40.0 to 55.0 mol.-%, yet more preferably in the range of 45.0 to 55.0 mol, like in the range of 40.0 to 49.0 mol.-%. The amount is measured on the heterophasic composition (HECO) to be modified, i.e. before the heterophasic composition (HECO) has been further chemically treated with the bifunctionally unsaturated monomer(s) (D') and/or at least multifunctionally unsaturated low molecular weight polymer(s) (D"), e.g. on the heterophasic composition (HECO1). The calculation of the comonomer content of the elastomeric propylene copolymer (ESC) is defined in the example section and is based on the heterophasic composition (HECO) to be modified, e.g. on the heterophasic composition (HECO1).

Further the modified heterophasic composition (mHECO) comprises units (D) derived from bifunctionally unsaturated monomer(s) (D') and/or multifunctionally unsaturated low molecular weight polymer(s) (D").

"Bifunctionally unsaturated or multifunctionally unsaturated" as used herein means preferably the presence of two or more non-aromatic double bonds, as in e.g. divinylbenzene or cyclopentadiene or polybutadiene. Only such bi- or multifunctionally unsaturated compounds are used which can be polymerised preferably with the aid of free radicals. The unsaturated sites in the bi- or multifunctionally unsaturated compounds are in their chemically bound state not actually "unsaturated", because the double bonds are each used for a covalent bond to the polymer chains of the (semi)crystalline polypropylene (mPP) and/or the elastomeric propylene copolymer (mESC).

The bifunctionally unsaturated monomers (D') may be
divinyl compounds, such as divinylaniline, m-divinylbenzene, p-divinylbenzene, divinylpentane and divinylpropane;
allyl compounds, such as allyl acrylate, allyl methacrylate, allyl methyl maleate and allyl vinyl ether;
dienes, such as 1,3-butadiene, chloroprene, cyclohexadiene, cyclopentadiene, 2,3-dimethylbutadiene, heptadiene, hexadiene, isoprene and 1,4-pentadiene;
aromatic and/or aliphatic bis (maleimide) bis (citraconimide) and mixtures of these unsaturated monomers.

Especially preferred bifunctionally unsaturated monomers (D') are 1,3-butadiene, isoprene, dimethyl butadiene and divinylbenzene.

The multifunctionally unsaturated low molecular weight polymer (D"), preferably having a number average molecular weight $(M_n) \leq 10000$ g/mol, may be synthesized from one or more unsaturated monomers.

Examples of such low molecular weight polymers are
polybutadienes, especially where the different microstructures in the polymer chain, i.e. 1,4-cis, 1,4-trans and 1,2-(vinyl) are predominantly in the 1,2-(vinyl) configuration;
copolymers of butadiene and styrene having 1,2-(vinyl) in the polymer chain.

A preferred low molecular weight polymer is polybutadiene, in particular a polybutadiene having more than 50.0 wt.-% of the butadiene in the 1,2-(vinyl) configuration.

In one preferred embodiment units (D) are derived from polybutadiene having a number average molecular weight $(M_n)$ in the range of 1000 to 3000 g/mol, more preferably in the range of 1200 to 2800 g/mol.

Preferably the modified heterophasic composition (mHECO) contains units (D) in an amount of preferably at least 0.1 wt.-%, more preferably in the range of 0.1 to 5.0 wt.-%, still more preferably in the range of 0.5 to 4.0 wt.-%, like in the range 0.8 to 3.5 wt.-%, like in the range 1.1 to 3.0 wt.-%. This amount is not measured on the final product, i.e. on the modified heterophasic composition (mHECO), but has been calculated on the amounts used to establish the modification of a heterophasic composition (HECO), like the heterophasic composition (HECO1). That is this amount has been calculated by the following formula $$\frac{D}{(HECO + D)}$$

wherein
D is the total amount [g] of the bifunctionally unsaturated monomer(s) (D') and/or multifunctionally unsaturated low molecular weight polymer(s) (D") used for producing the modified heterophasic composition (mHECO), HECO is the total amount [g] of the heterophasic composition (HECO) to be modified, e.g. the heterophasic composition (HECO1).

As mentioned above the modified heterophasic composition (mHECO) is the result of chemically modifying a heterophasic composition with bifunctionally unsaturated monomer(s) (D') and/or multifunctionally unsaturated low molecular weight polymer(s) (D"). The bifunctionally unsaturated monomer(s) (D') and/or multifunctionally unsaturated low molecular weight polymer(s) (D") form units (D) which are covalently coupled to the polymers of the heterophasic composition. That is the modification is preferably a chemical linking between the polymer components, as for instance between the (semi)crystalline polypropylene (mPP) and elastomeric propylene copolymer (mESC) (so called phase coupling) and/or between the individual chains of the (semi)crystalline polypropylene (mPP) and elastomeric propylene copolymer (mESC), respectively. Accordingly the bifunctionally unsaturated monomer(s) (D') and/or multifunctionally unsaturated low molecular weight polymer(s) (D") act as coupling agent between the (semi)crystalline polypropylene (mPP) and elastomeric propylene copolymer (mESC) or, and more preferably, between the polymer chains of the elastomeric propylene copolymer (mESC) and/or between the polymer chains of the (semi)crystalline polypropylene (mPP). It is believed that those molecules, which—with one of their functionalities—are bound to a polymer molecule of the (semi)crystalline polypropylene (mPP) and—with their second or one of their further functionalities—are bound to a polymer molecule belonging to the disperse phase, i.e. the elastomeric propylene copolymer (mESC), effect the coupling action. Alternatively and preferably the bifunctionally or multifunctionally unsaturated compounds bound with one of their functionalities—to a polymer molecule of the elastomeric propylene copolymer (mESC) and—with their second or one of their further functionalities—bound to another polymer molecule belonging also to the elastomeric propylene copolymer (mESC). It might of course also possible that the bifunctionally or multifunctionally unsaturated compounds modify in a similar manner the different polymer chains of the (semi)crystalline polypropylene (mPP).

In the following first the heterophasic composition is defined which is modified and subsequently the modification treatment step is described.

The heterophasic composition to be modified can be the heterophasic composition (HECO) discussed above. However it is preferred that the heterophasic composition to be modified is the heterophasic composition (HECO1) which will be described in more detail now.

The Heterophasic Composition (HECO1)

The heterophasic composition (HECO1) preferably comprises a (semi)crystalline polypropylene (PP1) as a matrix in which an elastomeric propylene copolymer (ESC1) is dispersed. Accordingly the elastomeric propylene copolymer (ESC1) is (finely) dispersed in the (semi)crystalline polypropylene (PP1). In other words the (semi)crystalline polypropylene (PP1) constitutes a matrix in which the elastomeric propylene copolymer (ESC1) forms inclusions in the matrix, i.e. in the (semi)crystalline polypropylene (PP1). Thus the matrix contains (finely) dispersed inclusions being not part of the matrix and said inclusions contain the elastomeric propylene copolymer (ESC1). The term "inclusion" according to this invention shall preferably indicate that the matrix and the inclusion form different phases within the heterophasic composition (HECO1), said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Preferably, the heterophasic composition (HECO1) has a melt flow rate $MFR_2$ (230° C., 2.16 kg) in the range of 3 to 20 g/10 min, more preferably in the range of 5 to 17 g/10 min, still more preferably in the range of 8 to 15 g/10 min.

As mentioned above, the heterophasic composition (HECO1) according to this invention preferably comprises
(a) a (semi)crystalline polypropylene (PP1) as the matrix (M) and
(b) an elastomeric propylene copolymer (ESC1).

Preferably the weight ratio between the (semi)crystalline polypropylene (PP) and the elastomeric propylene copolymer (ESC) [PP/ESC] of the heterophasic composition (HECO1) is in the range of 80/20 to 40/60, more preferably in the range of 75/35 to 45/55, yet more preferably in the range of 70/30 to 50/50, like in the range of 70/30 to 60/40.

Preferably, the heterophasic composition (HECO1) has a comonomer content, preferably a content of ethylene and/or $C_4$ to $C_{12}$ α-olefin, more preferably an ethylene content, of equal or below 30.0 mol.-%, more preferably in the range of 10.0 to 30.0 mol.-%, still more preferably in the range of 12.0 to 28.0 mol.-%, yet more preferably in the range of 15.0 to 25.0 mol.-%.

Preferably the heterophasic composition (HECO1) has a xylene cold soluble (XCS) fraction (25° C.) in the range of 20 to 45 wt.-%, more preferably in the range of 22 to 40 wt.-%, still more preferably in the range of 25 to 38 wt.-% and most preferably in the range of 28 to 35 wt. %.

Preferably the comonomer content, preferably the content of ethylene and/or $C_4$ to $C_{12}$ α-olefin, more preferably the content of ethylene, of the xylene cold soluble fraction (XCS) of the heterophasic composition (HECO1) is in the range of 30.0 to 60 mol.-%, more preferably in the range of 35.0 to 58.0 mol.-%, still more preferably in the range of 40.0 to 55.0 mol.-%, yet more preferably in the range of 45.0 to 55.0 mol.-%.

In a preferred embodiment the intrinsic viscosity (IV) of the xylene cold soluble fraction (XCS) of the heterophasic composition (HECO1) is at least 2.0 dl/g, more preferably at least 2.5 dl/g. On the other hand the intrinsic viscosity (IV) should be not too high otherwise the flowability is decreased. Thus the intrinsic viscosity of xylene cold soluble fraction (XCS) of the heterophasic composition (HECO1) is preferably in the range of 2.0 to 4.0 dl/g, more preferably in the range 2.6 to 3.8 dl/g and even more preferably in the range of 2.8 to 3.5 dl/g.

The (semi)crystalline polypropylene (PP1) is preferably a (semi)crystalline random propylene copolymer (R-PP1) or a (semi)crystalline propylene homopolymer (H-PP1), the latter especially preferred.

In case the (semi)crystalline polypropylene (PP1) is a (semi)crystalline random propylene copolymer (R-PP1) it is appreciated that the (semi)crystalline random propylene copolymer (R-PP1) comprises monomers co-polymerizable with propylene, for example co-monomers such as ethylene and/or $C_4$ to $C_{12}$ α-olefins, in particular ethylene and/or $C_4$ to $C_8$ α-olefins, e.g. 1-butene and/or 1-hexene.

Preferably the (semi)crystalline random propylene copolymer (R-PP1) according to this invention comprises, especially consists of, monomers co-polymerizable with propylene from the group consisting of ethylene, 1-butene and 1-hexene. More specifically the (semi)crystalline random propylene copolymer (R-PP1) of this invention comprises—apart from propylene—units derivable from ethylene and/or 1-butene. In a preferred embodiment the (semi)crystalline random propylene copolymer (R-PP1) comprises units derivable from ethylene and propylene only.

Additionally it is appreciated that the (semi)crystalline random propylene copolymer (R-PP1) has preferably a comonomer content in the range of more than 0.3 to 1.5 mol.-%, more preferably in the range of more than 0.35 to 1.2 mol.-%, yet more preferably in the range of 0.4 to 1.0 mol.-%.

Further it is appreciated that the (semi)crystalline polypropylene (PP1), like (semi)crystalline propylene homopolymer (H-PP1), has a melt flow rate $MFR_2$ (230° C.) measured according to ISO 1133 of 20 to 100 g/10 min, more preferably of 30 to 80 g/10 min, still more preferably of 40 to 70 g/10 min, still more preferably of 50 to 60 g/10 min.

Further it is preferred that the semicrystalline polypropylene (PP1) according to this invention has a xylene soluble fraction (XCS) of not more than 10 wt.-%, in case of a (semi)crystalline propylene homopolymer (H-PP1) the xylene soluble fraction (XCS) is even lower, i.e. not more than 6.0 wt.

Accordingly it is preferred that the (semi)crystalline propylene homopolymer (H-PP1) has a xylene soluble fraction (XCS) of below 5.0 wt.-%, more preferably in the range of 0.5 to 4.5, like in the range of 1.0 to 3.5 wt.-%.

The second component of the heterophasic composition (HECO1) is the elastomeric propylene copolymer (ESC1).

Preferably said elastomeric propylene copolymer (ESC1) comprises units derived from
  propylene and
  ethylene and/or $C_4$ to $C_{12}$ α-olefin.

The elastomeric propylene copolymer (ESC1) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and/or at least another α-olefin selected form the group consisting of 1-butene, 1-pentene, 1-hexene, 1-heptene and 1-octene. It is especially preferred that the elastomeric propylene copolymer (ESC) comprises at least units derivable from (i) propylene and (ii) ethylene or 1-butene. In one specific embodiment the elastomeric propylene copolymer (ESC1) comprises units derivable from propylene and ethylene only.

The comonomer content, like the ethylene content, of the elastomeric propylene copolymer (ESC1) of the heterophasic composition (HECO1) is in the range of 30.0 to 60 mol.-%, more preferably in the range of 35.0 to 58.0 mol.-%, still more preferably in the range of 40.0 to 55.0 mol.-%, yet more preferably in the range of 45.0 to 55.0 mol, like in the range of 40.0 to 49.0 mol.-%.

The heterophasic composition (HECO1) can be produced by blending the (semi)crystalline polypropylene (PP1) and the elastomeric propylene copolymer (ESC1). However, it is preferred that the heterophasic composition (HECO1) is produced in a sequential step process, using reactors in serial configuration and operating at different reaction conditions. As a consequence, each fraction prepared in a specific reactor may have its own molecular weight distribution and/or comonomer content distribution.

The heterophasic composition (HECO1) according to this invention is preferably produced in a sequential polymerization process, i.e. in a multistage process, known in the art, wherein the (semi)crystalline polypropylene (PP1) is produced at least in one slurry reactor, preferably in a slurry reactor and optionally in a subsequent gas phase reactor, and subsequently the elastomeric propylene copolymer (ESC1) is produced at least in one, i.e. one or two, gas phase reactor(s).

Accordingly it is preferred that the heterophasic composition (HECO1) is produced in a sequential polymerization process comprising the steps of
(a) polymerizing propylene and optionally at least one ethylene and/or $C_4$ to $C_{12}$ α-olefin in a first reactor (R1) obtaining the first polypropylene fraction of the (semi)crystalline polypropylene (PP1), preferably said first polypropylene fraction is a propylene homopolymer,
(b) transferring the first polypropylene fraction into a second reactor (R2),
(c) polymerizing in the second reactor (R2) and in the presence of said first polypropylene fraction propylene and optionally at least one ethylene and/or $C_4$ to $C_{12}$ α-olefin obtaining thereby the second polypropylene fraction, preferably said second polypropylene fraction is a second propylene homopolymer, said first polypropylene fraction and said second polypropylene fraction form the (semi)crystalline polypropylene (H-PP1), i.e. the matrix of the heterophasic composition (HECO1),
(d) transferring the (semi)crystalline polypropylene (PP1) of step (c) into a third reactor (R3),
(e) polymerizing in the third reactor (R3) and in the presence of the (semi)crystalline polypropylene (PP1) obtained in step (c) propylene and at least one ethylene and/or $C_4$ to $C_{12}$ α-olefin obtaining thereby a first elastomeric propylene copolymer fraction, the first elastomeric propylene copolymer fraction is dispersed in the (semi)crystalline polypropylene (PP1),
(f) transferring the (semi)crystalline polypropylene (PP1) in which the first elastomeric propylene copolymer fraction is dispersed in a fourth reactor (R4), and
(g) polymerizing in the fourth reactor (R4) and in the presence of the mixture obtained in step (e) propylene and at least one ethylene and/or $C_4$ to $C_{12}$ α-olefin obtaining thereby the second elastomeric propylene copolymer fraction, the first and the second elastomeric propylene copolymer fraction form together the elastomeric propylene copolymer (ESC1);
the (semi)crystalline polypropylene (PP1) and the elastomeric propylene copolymer (ESC1) form the heterophasic composition (HECO1).

Of course, in the first reactor (R1) the second polypropylene fraction can be produced and in the second reactor (R2) the first polypropylene fraction can be obtained. The same holds true for the elastomeric propylene copolymer phase. Accordingly in the third reactor (R3) the second elastomeric propylene copolymer fraction can be produced whereas in the fourth reactor (R4) the first elastomeric propylene copolymer fraction is made.

Preferably between the second reactor (R2) and the third reactor (R3) and optionally between the third reactor (R3) and fourth reactor (R4) the monomers are flashed out.

The term "sequential polymerization process" indicates that the heterophasic composition (HECO1) is produced in at least two, like three or four reactors connected in series. Accordingly the present process comprises at least a first reactor (R1) and a second reactor (R2), more preferably a first reactor (R1), a second reactor (R2), a third reactor (R3) and a fourth reactor (R4). The term "polymerization reactor" shall indicate that the main polymerization takes place. Thus in case the process consists of four polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) and the fourth reactor (R4) are preferably gas phase reactors (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like a loop reactor (LR), whereas the second reactor (R2), the third reactor (R3) and the fourth reactor (R4) are gas phase reactors (GPR). Accordingly for the instant process at least four, preferably four polymerization reactors, namely a slurry reactor (SR), like a loop reactor (LR), a first gas phase reactor (GPR-1), a second gas phase reactor (GPR-2) and a third gas phase reactor (GPR-3) connected in series are used. If needed prior to the slurry reactor (SR) a pre-polymerization reactor is placed.

In another preferred embodiment the first reactor (R1) and second reactor (R2) are slurry reactors (SR), like a loop reactors (LR), whereas the third reactor (R3) and the fourth reactor (R4) are gas phase reactors (GPR). Accordingly for the instant process at least four, preferably four polymerization reactors, namely two slurry reactors (SR), like two loop reactors (LR), first gas phase reactor (GPR-1) and a second gas phase reactor (GPR-2) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic composition (HECO1) as defined above the conditions for the first reactor (R1), i.e. the slurry reactor (SR), like a loop reactor (LR), of step (a) may be as follows:
the temperature is within the range of 50° C. to 110° C., preferably between 60° C. and 100° C., more preferably between 68 and 95° C.,
the pressure is within the range of 20 bar to 80 bar, preferably between 40 bar to 70 bar,
hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third reactor (R3) and the fourth reactor (R4), preferably in the second gas phase reactor (GPR-2) and third gas phase reactor (GPR-3), is similar to the second reactor (R2).

The residence time can vary in the three reactor zones.

In one embodiment of the process for producing the polypropylene the residence time in bulk reactor, e.g. loop is in the range 0.1 to 2.5 hours, e.g. 0.15 to 1.5 hours and the residence time in gas phase reactor will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic composition (HECO1) is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention for preparing the heterophasic composition (HECO1) is prepared by a) reacting a spray crystallized or emulsion solidified adduct of MgCl$_2$ and a C$_1$-C$_2$ alcohol with TiCl$_4$ b) reacting the product of stage a) with a dialkylphthalate of formula (I)

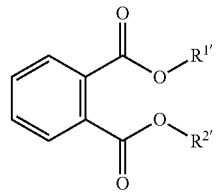

wherein R$^{1'}$ and R$^{2'}$ are independently at least a C$_5$ alkyl under conditions where a transesterification between said C$_1$ to C$_2$ alcohol and said dialkylphthalate of formula (I) takes place to form the internal donor c) washing the product of stage b) or d) optionally reacting the product of step c) with additional TiCl$_4$.

The procatalyst is produced as defined for example in the patent applications WO 87/07620, WO 92/19653, WO 92/19658 and EP 0 491 566. The content of these documents is herein included by reference.

First an adduct of MgCl$_2$ and a C$_1$-C$_2$ alcohol of the formula MgCl$_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl$_2$*nROH, wherein R is methyl or ethyl, preferably ethyl and n is 1 to 6, is contacting with TiCl$_4$ to form a titanized carrier, followed by the steps of adding to said titanised carrier (i) a dialkylphthalate of formula (I) with R$^{1'}$ and R$^{2'}$ being independently at least a C$_5$-alkyl, like at least a C$_8$-alkyl, or preferably (ii) a dialkylphthalate of formula (I) with R$^{1'}$ and R$^{2'}$ being the same and being at least a C$_5$-alkyl, like at least a C$_8$-alkyl, or more preferably (iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate, to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

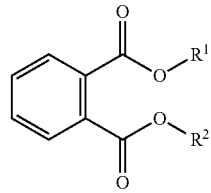

with R$^1$ and R$^2$ being methyl or ethyl, preferably ethyl, the dialkylphthalat of formula (II) being the internal donor and recovering said transesterification product as the procatalyst composition (component (i)).

The adduct of the formula $MgCl_2 \cdot nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the heterophasic composition (HECO1) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by $$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \qquad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [$Si(OCH_3)_2(cyclo-pentyl)_2$], diisopropyl dimethoxy silane [$Si(OCH_3)_2(CH(CH_3)_2)_2$].

Most preferably the external donor is dicyclopentyl dimethoxy silane [$Si(OCH_3)_2(cyclo-pentyl)_2$].

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic composition (HECO1) according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The modified heterophasic composition (mHECO) is chemically modified due to the reaction of the bifunctionally unsaturated monomer(s) (D') and/or multifunctionally unsaturated low molecular weight polymer(s) (D'') with the heterophasic composition (HECO) or more preferably with the heterophasic composition (HECO1).

The reaction may be performed in the presence of a thermally free radical forming agent, e.g. decomposing free radical-forming agent, like a thermally decomposable peroxide and/or ionising radiation or microwave radiation.

Peroxides are preferred thermally decomposing free radical-forming agents. More preferably the thermally decomposing free radical-forming agents are selected from the group consisting of acyl peroxide, alkyl peroxide, hydroperoxide, perester and peroxycarbonate.

The following listed peroxides are in particular preferred:

Acyl peroxides: benzoyl peroxide, 4-chlorobenzoyl peroxide, 3-methoxybenzoyl peroxide and/or methyl benzoyl peroxide.

Alkyl peroxides: allyl t-butyl peroxide, 2,2-bis(t-butylperoxybutane), 1,1-bis(t-butylperoxy)-3,3,5-trimethylcyclohexane, n-butyl-4,4-bis(t-butylperoxy) valerate, diisopropylaminomethyl-t-amyl peroxide, dimethylaminomethyl-t-amyl peroxide, diethylaminomethyl-t-butyl peroxide, dimethylaminomethyl-t-butyl peroxide, 1,1-di-(t-amylperoxy)cyclohexane, t-amyl peroxide, t-butylcumyl peroxide, t-butyl peroxide and/or 1-hydroxybutyl n-butyl peroxide.

Peresters and peroxy carbonates: butyl peracetate, cumyl peracetate, cumyl perpropionate, cyclohexyl peracetate, di-t-butyl peradipate, di-t-butyl perazelate, di-t-butyl perglutarate, di-t-butyl perthalate, di-t-butyl persebacate, 4-nitrocumyl perpropionate, 1-phenylethyl perbenzoate, phenylethyl nitro-perbenzoate, t-butylbicyclo-(2,2,1)heptane percarboxylate, t-butyl-4-carbomethoxy perbutyrate, t-butylcyclobutane percarboxylate, t-butylcyclohexyl peroxycarboxylate, t-butylcyclopentyl percarboxylate, t-butylcyclopropane percarboxylate, t-butyldimethyl percinnamate, t-butyl-2-(2,2-diphenylvinyl) perbenzoate, t-butyl-4-methoxy perbenzoate, t-butylperbenzoate, t-butylcarboxycyclohexane, t-butyl pernaphthoate, t-butyl peroxyisopropylcarbonate, t-butyl pertoluate, t-butyl-1-phenylcyclopropyl percarboxylate, t-butyl-2-propylperpentene-2-oate, t-butyl-1-methylcyclopropyl percarboxylate, t-butyl-4-nitrophenyl peracetate, t-butylnitrophenyl peroxycarbamate, t-butyl-N-succiimido percarboxylate, t-butyl percrotonate, t-butyl permaleic acid, t-butyl permethacrylate, t-butyl peroctoate, t-butyl peroxyisopropylcarbonate, t-butyl perisobutyrate, t-butyl peracrylate and/or t-butyl perpropionate;

Or mixtures of these above listed free radical-forming agents.

The modification can be for instance effected by dosing the heterophasic composition (HECO) or more preferably the heterophasic composition (HECO1) into a twin screw extruder like Prism TSE24 40D with preferably a temperature profile 80/200/210/220/220/230/230/220/225/220° C. and a screw speed of 300 rpm. After heating and melting of the polymer mixture, a solution of the thermally decomposing free radical-forming agent, like tert-butylperoxy isopropyl carbonate, preferably in acetone (10.0 wt.-%) is injected directly into the extruder, achieving a concentration of 0.1 to 3.0 wt.-% of the thermally decomposing free radical-forming agent, based on the mixture. Through a second injection port, the bifunctionally monomer(s) (D') and/or multifunctionally unsaturated low molecular weight polymer(s) (D"), like butadiene, is injected into the same zone of the extruder as the thermally decomposing free radical-forming agent has been added. The polymer melt/liquid/gas mixture is passed through the extruder, then to intensive devolatilisation, discharged and pelletised.

The Inorganic Filler (F)

As a further requirement of the composition according to this invention is the presence of an inorganic filler (F). Thus, the filler (F) is not regarded as being encompassed by the additives (AD) defined in more detail below.

Preferably inorganic filler (F) is mineral filler. It is appreciated that the inorganic filler (F) is a phyllosilicate, mica or wollastonite. Even more preferred the inorganic filler (F) is selected from the group consisting of mica, wollastonite, kaolinite, smectite, montmorillonite and talc. The most preferred the inorganic filler (F) is talc.

It is appreciated that the filler (F) has median particle size ($D_{50}$) in the range of 0.8 to 20 µm and a top cut particle size ($D_{95}$) in the range of 10 to 20 µm, preferably a median particle size ($D_{50}$) in the range of 5.0 to 8.0 µm and top cut particle size ($D_{95}$) in the range of 12 to 17 µm, more preferably a median particle size (Dm) in the range of 5.5 to 7.8 µm and top cut particle size ($D_{95}$) of 13 to 16.5 µm.

According to this invention the filler (F) does not belong to the class of alpha nucleating agents (NU) and additives (AD).

The the filler (F) is state of the art and a commercially available product.

The Alpha Nucleating Agents (NU) In one embodiment of the invention the composition comprises alpha-nucleating agent, more preferably the composition is free of beta-nucleating agent.

According to this invention the alpha nucleating agent (NU) is not an additive (AD).

The alpha-nucleating agent is preferably selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
(iv) vinylcycloalkane polymer or vinylalkane polymer, and
(v) mixtures thereof.

Preferably the alpha-nucleating agent comprised in the composition of the invention is vinylcycloalkane polymer and/or vinylalkane polymer, more preferably vinylcycloalkane polymer, like vinylcyclohexane (VCH) polymer. Vinyl cyclohexane (VCH) polymer is particularly preferred as α-nucleating agent. It is appreciated that the amount of vinylcycloalkane, like vinylcyclohexane (VCH), polymer and/or vinylalkane polymer, more preferably of vinylcyclohexane (VCH) polymer, in the composition is not more than 500 ppm, preferably not more than 200 ppm, more preferably not more than 100 ppm, like in the range of 0.1 to 500 ppm, preferably in the range of 0.5 to 200 ppm, more preferably in the range of 1 to 100 ppm. Furthermore, it is appreciated that the vinylcycloalkane polymer and/or vinylalkane polymer is introduced into the composition by the BNT technology. With regard to the BNT-technology reference is made to the international applications WO 99/24478, WO 99/24479 and particularly WO 00/68315. According to this technology a catalyst system, preferably a Ziegler-Natta procatalyst, can be modified by polymerizing a vinyl compound in the presence of the catalyst system, comprising in particular the special Ziegler-Natta procatalyst, an external donor and a cocatalyst, which vinyl compound has the formula:

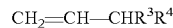

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of at least one of the heterophasic compositions present in the inventive composition. The polymerized vinyl compound acts as an alpha-nucleating agent. The weight ratio of vinyl compound to solid catalyst component in the modification step of the catalyst is preferably of up to 5 (5:1), more preferably up to 3 (3:1), like in the range of 0.5 (1:2) to 2 (2:1).

Such nucleating agents are commercially available and are described, for example, in "Plastic Additives Handbook", 5th edition, 2001 of Hans Zweifel (pages 967 to 990).

Additives (AD)

In addition to the heterophasic composition (HECO), the modified heterophasic composition (HECO1) and the inorganic filler (F) the composition of the invention may include additives (AD). Typical additives are acid scavengers, antioxidants, colorants, light stabilisers, plasticizers, slip agents, anti-scratch agents, dispersing agents, processing aids, lubricants, pigments, and the like. As indicated above the inorganic filler (F) is not regarded as an additive (AD).

Such additives are commercially available and for example described in "Plastic Additives Handbook", 6$^{th}$ edition 2009 of Hans Zweifel (pages 1141 to 1190).

Furthermore, the term "additives (AD)" according to the present invention also includes carrier materials, in particular polymeric carrier materials (PCM).

The Polymeric Carrier Material (PCM)

Preferably the composition of the invention does not comprise (a) further polymer (s) different to the heterophasic composition (HECO) and the modified heterophasic composition (HECO1) in an amount exceeding 10 wt.-%, preferably in an amount exceeding 5 wt.-%, more preferably in an amount exceeding 3 wt.-%, based on the weight of the composition. If an additional polymer is present, such a polymer is typically a polymeric carrier material (PCM) for additives (AD). Any carrier material for additives (AD) is not calculated to the amount of polymeric compounds as indicated in the present invention, but to the amount of the respective additive.

The polymeric carrier material (PCM) is a carrier polymer for the other additives (AD) to ensure a uniform distribution in the composition of the invention. The polymeric carrier material (PCM) is not limited to a particular polymer. The polymeric carrier material (PCM) may be ethylene homopolymer, ethylene copolymer obtained from ethylene and α-olefin comonomer such as $C_3$ to $C_8$ α-olefin comonomer, propylene homopolymer and/or propylene copolymer obtained from propylene and α-olefin comonomer such as ethylene and/or $C_4$ to $C_8$ α-olefin comonomer.

The Article

The composition of the present invention is preferably used for the production of articles, more preferably of molded articles, yet more preferably of injection molded articles. Even more preferred is the use for the production of parts of washing machines or dishwashers as well as automotive articles, especially of car interiors and exteriors, like bumpers, side trims, step assists, body panels, spoilers, dashboards, interior trims and the like.

The current invention also provides articles, more preferably molded articles, like injection molded articles, comprising, preferably comprising at least 60 wt.-%, more preferably at least 80 wt.-%, yet more preferably at least 95 wt.-%, like consisting of, the inventive composition. Accordingly the present invention is especially directed to parts of washing machines or dishwashers as well as to automotive articles, especially to car interiors and exteriors, like bumpers, side trims, step assists, body panels, spoilers, dashboards, interior trims and the like, comprising, preferably comprising at least 60 wt.-%, more preferably at least 80 wt.-%, yet more preferably at least 95 wt.-%, like consisting of, the inventive composition.

The Use

The present invention is also directed to the use of the modified heterophasic composition (mHECO) as defined herein to reduce tigerskin of a composition comprising said modified heterophasic composition (mHECO) and a polypropylene (P) different to the modified heterophasic composition (mHECO). More preferably the polypropylene (P) is a heterophasic system comprising a polypropylene, like a propylene homopolymer, as matrix in which an elastomeric propylene copolymer, like a propylene ethylene rubber is dispersed. More preferably the polypropylene (P) is the heterophasic composition (HECO) as defined herein. Still more preferably the invention is directed the use of the modified heterophasic composition (mHECO) as defined herein to reduce tigerskin of a composition comprising in addition to the modified heterophasic composition (mHECO)

(a) the heterophasic composition (HECO) as defined in detail above;
and/or
(b) inorganic filler (F), preferably talc, as defined above.

For instance the invention is directed the use of the modified heterophasic composition (mHECO) as defined herein to reduce tigerskin of a composition comprising (a) 45 to 85 wt.-%, based on the total weight of the composition, of the heterophasic composition (HECO);
(b) 5 to 25 wt.-%, based on the total weight of the composition, of the inorganic filler (F); and
(c) 5 to 30 wt.-%, based on the total weight of the composition, of the modified heterophasic composition (mHECO).

Yet more preferably the invention is directed the use of the modified heterophasic composition (mHECO) as defined herein to reduce tigerskin of the composition as defined in detail above.

The reduction of tigerskin is preferably accomplished in case of MSE values equal or below 30, more preferably in the range of 10 to 30, yet more preferably in the range of 10 to 25.

The present invention will now be described in further detail by the examples provided below.

EXAMPLES

1. Definitions/Measuring Methods

The following definitions of terms and determination methods apply for the above general description of the invention as well as to the below examples unless otherwise defined.

Quantification of Microstructure by NMR Spectroscopy

Quantitative nuclear-magnetic resonance (NMR) spectroscopy was used to quantify the comonomer content of the polymers. Quantitative $^{13}C$ {$^{1}H$} NMR spectra were recorded in the solution-state using a Bruker Advance III 400 NMR spectrometer operating at 400.15 and 100.62 MHz for $^{1}H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra.

Quantitative $^{13}C$ {$^{1}H$} NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W.-J., Zhu, S., Macromolecules 33 (2000), 1157) through integration of multiple signals across the whole spectral region in the $^{13}C$ {$^1H$} spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W.-J., Zhu, S., Macromolecules 33 (2000), 1157). Equations used for absolute propylene content were not modified.

The mole percent comonomer incorporation was calculated from the mole fraction:

$$E[mol\ \%]=100*fE$$

The weight percent comonomer incorporation was calculated from the mole fraction:

$$E[wt\ \%]=100*(fE*28.06)/((fE*28.06)+((1-fE)*42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Calculation of comonomer content, like ethylene content, of the elastomeric propylene copolymer (ESC) or (ESC1):

$$\frac{C(P)-w(A)\times C(A)}{w(B)}=C(B)$$

wherein
w(A) is the weight fraction [in wt.-%] of the (semi)crystalline polypropylene (PP) or (PP1), w(B) is the weight fraction [in wt.-%] of the elastomeric propylene copolymer (ESC) or (ESC1), C(A) is the comonomer content [in mol-%] of the (semi)crystalline polypropylene (PP) or (PP1), C(P) is the comonomer content [in mol-%] of the heterophasic composition (HECO) or (HECO1), C(B) is the calculated comonomer content [in mol-%] of the elastomeric propylene copolymer (ESC) or (ESC1).

Number Average Molecular Weight ($M_n$), Weight Average Molecular Weight ($M_w$), z-Average Molecular Weight ($M_z$)

Molecular weight averages Mw, Mn and Mz were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 μL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

$MFR_2$ (230° C.) is measured according to ISO 1133 (230° C., 2.16 kg load).

$MFR_2$ (190° C.) is measured according to ISO 1133 (190° C., 2.16 kg load).

The xylene cold solubles (XCS, wt.-%): Content of xylene cold solubles (XCS) is determined at 25° C. according to ISO 16152; first edition; 2005-07-01.

The gel content is assumed to be identical to the xylene hot insoluble (XHI) fraction, which is determined by extracting 1 g of finely cut polymer sample with 350 ml xylene in a Soxhlet extractor for 48 hours at the boiling temperature. The remaining solid amount is dried at 90° C. and weighed for determining the insolubles amount.

Intrinsic viscosity is measured according to DIN ISO 1628/1, October 1999 (in Decalin at 135° C.).

Tensile modulus was measured according to ISO 527-2 (cross head speed=1 mm/min; 23° C.) using injection molded specimens as described in EN ISO 1873-2 (dog bone shape, 4 mm thickness). The measurement is done after 96 h conditioning time of the specimen.

Charpy notched impact strength is determined according to ISO 180/1A at 23° C. and at −20° C. by using injection moulded test specimens as described in EN ISO 1873-2 (80×10×4 mm).

Flow Marks

The tendency to show flow marks was examined with a method as described below. This method is described in detail in WO 2010/149529, which is incorporated herein in its entirety.

An optical measurement system, as described by Sybille Frank et al. in PPS 25 Intern. Conf. Polym. Proc. Soc 2009 or Proceedings of the SPIE, Volume 6831, pp 68130T-68130T-8 (2008) was used for characterizing the surface quality.

This method consists of two aspects:
1. Image Recording:
The basic principle of the measurement system is to illuminate the plates with a defined light source (LED) in a closed environment and to record an image with a CCD-camera system.

A schematic setup is given in FIG. 1.

2. Image Analysis:

The specimen is floodlit from one side and the upwards reflected portion of the light is deflected via two mirrors to a CCD-sensor. The such created grey value image is analyzed in lines. From the recorded deviations of grey values the mean square error (MSE) is calculated allowing a quantification of surface quality, i.e. the larger the MSE value the more pronounced is the surface defect.

Generally, for one and the same material, the tendency to flow marks increases when the injection speed is increased.

For this evaluation plaques 210×148×3 mm$^3$ with grain VW K50 and a filmgate of 1.4 mm were used and were produced with a filling time of 1 sec (MSE 1).

Further conditions:
Melt temperature: 240° C.
Mould temperature 30° C.
Dynamic pressure: 10 bar hydraulic The smaller the MSE value is at a certain filling time, the smaller is the tendency for flow marks.

The Particle Size median ($D_{50}$) and top cut ($D_{95}$) are calculated from the particle size distribution determined by laser diffraction according to ISO 13320-1:1999.

2. Examples

Preparation of HECO 80 mg of ZN104-catalyst of LyondellBasell is activated for 5 minutes with a mixture of Triethylaluminium (TEAL; solution in hexane 1 mol/l) and Dicyclopentyldimethoxysilane as donor (0.3 mol/l in hexane)—in a molar ratio of 18.7 (Co/ED) after a contact time of 5 min- and 10 ml hexane in a catalyst feeder. The molar ratio of TEAL and Ti of catalyst is 220 (Co/TC)). After activation the catalyst is spilled with 250 g propylene into the stirred reactor with a temperature of 23° C. Stirring speed is hold at 250 rpm. After 6 min prepolymersation at 23° C. the polymerisation starts as indicated in table 1.

TABLE 1

Polymerization of HECO

| | | HECO |
|---|---|---|
| Prepoly | | |
| Residence time | [h] | 0.1 |
| Temperature | [° C.] | 30.3 |
| Co/ED ratio | [mol/mol] | 18.7 |
| Co/TC ratio | [mol/mol] | 220 |
| Loop (R1) | | |
| Residence time | [h] | 0.6 |
| Temperature | [° C.] | 70 |
| $H_2/C_3$ ratio | [mol/kmol] | 13.9 |
| MFR | [g/10 min] | 35 |
| XCS | [wt %] | 2.0 |
| C2 content | [mol %] | 0 |
| split | [wt %] | 32.5 |
| $1^{st}$ GPR (R2) | | |
| Residence time | [h] | 0.6 |
| Temperature | [° C.] | 78.4 |
| Pressure | [kPa] | 2214 |

TABLE 1-continued

Polymerization of HECO

| | | HECO |
|---|---|---|
| $H_2/C_3$ ratio | [mol/kmol] | 78 |
| MFR | [g/10 min] | 35 |
| XCS | [wt %] | 2.0 |
| C2 content | [mol %] | 0 |
| split | [wt %] | 34.5 |
| $2^{nd}$ GPR (R3) | | |
| Residence time | [h] | 0.6 |
| Temperature | [° C.] | 71 |
| Pressure | [kPa] | 2292 |
| $C_2/C_3$ ratio | [mol/kmol] | 715 |
| $H_2/C_2$ ratio | [mol/kmol] | 219 |
| MFR | [g/10 min] | 12 |
| XCS | [wt %] | 19 |
| C2 content | [mol %] | 12 |
| split | [wt %] | 21 |
| 3rd GPR (R4) | | |
| Residence time | [h] | 0.6 |
| Temperature | [° C.] | 83 |
| Pressure | [kPa] | 1383 |
| $C_2/C_3$ ratio | [mol/kmol] | 747 |
| $H_2/C_2$ ratio | [mol/kmol] | 203 |
| MFR | [g/10 min] | 13 |
| XCS | [wt %] | 30 |
| C2 content | [mol %] | 20 |
| split | [wt %] | 12 |

The properties of the products obtained from the individual reactors naturally are not measured on homogenized material but on reactor samples (spot samples). The properties of the final resin are measured on homogenized material, the $MFR_2$ on pellets made thereof in an extrusion mixing process as described below.

The HECO was mixed in a twin-screw extruder with 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphate (CAS-no. 31570-04-4, trade name Irgafos 168) supplied by BASF AG, and 0.05 wt % Calcium stearate (CAS-no. 1592-23-0) supplied by Croda Polymer Additives

TABLE 2

Properties of HECO

| | | HECO |
|---|---|---|
| H-PP (R1 + R2) | | |
| MFR | [g/10 min] | 35 |
| XCS | [wt %] | 2.0 |
| C2 content | [mol %] | 0 |
| split | [wt %] | 67 |
| ESC (R3 + R4) | | |
| split | [wt %] | 33 |
| HECO (final) | | |
| MFR | [g/10 min] | 13 |
| C2 content | [mol %] | 22 |
| XCS | [wt %] | 30 |
| C2 content of XCS | [mol %] | 50 |
| IV of XCS | [dl/g] | 2.2 |
| IV of XCI | [dl/g] | 1.6 |

Preparation of HECO1
Catalyst
First, 0.1 mol of $MgCl_2 \times 3$ EtOH was suspended under inert conditions in 250 ml of decane in a reactor at atmospheric pressure. The solution was cooled to the temperature of −15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried.

Catalyst and its preparation concept is described in general e.g. in patent publications EP 491566, EP 591224 and EP 586390.

The catalyst was further modified (VCH modification of the catalyst).

35 ml of mineral oil (Paraffinum Liquidum PL68) was added to a 125 ml stainless steel reactor followed by 0.82 g of triethyl aluminium (TEAL) and 0.33 g of dicyclopentyl dimethoxy silane (donor D) under inert conditions at room temperature. After 10 minutes 5.0 g of the catalyst prepared above (Ti content 1.4 wt.-%) was added and after additionally 20 minutes 5.0 g of vinylcyclohexane (VCH) was added. The temperature was increased to 60° C. during 30 minutes and was kept there for 20 hours. Finally, the temperature was decreased to 20° C. and the concentration of unreacted VCH in the oil/catalyst mixture was analysed and was found to be 200 ppm weight.

TABLE 3

Polymerization of HECO1

|  |  | HECO1 |
| --- | --- | --- |
| Prepoly |  |  |
| Residence time | [h] | 0.08 |
| Temperature | [° C.] | 30 |
| Co/ED ratio | [mol/mol] | 7.3 |
| Co/TC ratio | [mol/mol] | 220 |
| Loop (R1) |  |  |
| Residence time | [h] | 0.6 |
| Temperature | [° C.] | 72 |
| H$_2$/C$_3$ ratio | [mol/kmol] | 14.8 |
| MFR | [g/10 min] | 55 |
| XCS | [wt %] | 2.0 |
| C2 content | [mol %] | 0 |
| split | [wt %] | 30 |
| 1$^{st}$ GPR (R2) |  |  |
| Residence time | [h] | 0.75 |
| Temperature | [° C.] | 80 |
| Pressure | [kPa] | 2231 |
| H$_2$/C$_3$ ratio | [mol/kmol] | 149.7 |
| MFR | [g/10 min] | 55 |
| XCS | [wt %] | 2.0 |
| C2 content | [mol %] | 0 |
| split | [wt %] | 35 |
| 2$^{nd}$ GPR (R3) |  |  |
| Residence time | [h] | 0.6 |
| Temperature | [° C.] | 70 |
| Pressure | [kPa] | 2291 |
| C$_2$/C$_3$ ratio | [mol/kmol] | 584.6 |
| H$_2$/C$_2$ ratio | [mol/kmol] | 116.5 |
| MFR | [g/10 min] | 11 |
| XCS | [wt %] | 18 |
| C2 content | [mol %] | 17.5 |
| split | [wt %] | 20 |

TABLE 3-continued

Polymerization of HECO1

|  |  | HECO1 |
| --- | --- | --- |
| 3$^{rd}$ GPR (R4) |  |  |
| Residence time | [h] | 0.6 |
| Temperature | [° C.] | 85 |
| Pressure | [kPa] | 1421 |
| C$_2$/C$_3$ ratio | [mol/kmol] | 585.2 |
| H$_2$/C$_2$ ratio | [mol/kmol] | 92.7 |
| MFR$_2$ | [g/10 min] | 11 |
| XCS | [wt %] | 32 |
| C2 content | [mol %] | 18.5 |
| split | [wt %] | 15 |

The properties of the products obtained from the individual reactors naturally are not measured on homogenized material but on reactor samples (spot samples). The properties of the final resin are measured on homogenized material, the MFR$_2$ on pellets made thereof in an extrusion mixing process as described below.

The HECO1 was mixed in a twin-screw extruder with 0.1 wt % of Pentaerythrityl-tetrakis(3-(3',5'-di-tert. butyl-4-hydroxyphenyl)-propionate, (CAS-no. 6683-19-8, trade name Irganox 1010) supplied by BASF AG, 0.1 wt % Tris (2,4-di-t-butylphenyl) phosphate (CAS-no. 31570-04-4, trade name Irgafos 168) supplied by BASF AG, and 0.05 wt % Calcium stearate (CAS-no. 1592-23-0) supplied by Croda Polymer Additives.

TABLE 4

Properties of HECO1

|  |  | HECO1 |
| --- | --- | --- |
| H-PP1 (R1 + R2) |  |  |
| MFR | [g/10 min] | 55 |
| XCS | [wt %] | 2.0 |
| C2 content | [mol %] | 0 |
| split | [wt %] | 65 |
| ESC1 (R3 + R4) |  |  |
| split | [wt %] | 35 |
| HECO (final) |  |  |
| MFR | [g/10 min] | 11 |
| C2 content | [mol %] | 18.5 |
| XCS | [wt %] | 32 |
| C2 content of XCS | [mol %] | 48 |
| IV of XCS | [dl/g] | 3.1 |

Preparation of HECO-Comp

Catalyst

The catalyst used for HECO-Comp is the same as for HECO1.

TABLE 5

Polymerization of HECO-Comp

|  |  | HECO-Comp |
| --- | --- | --- |
| Prepoly |  |  |
| Residence time | [h] | 0.06 |
| Temperature | [° C.] | 30 |
| Do/Teal ratio | [mol/mol] | 7.3 |
| Tea/Ti ratio | [mol/mol] | 150 |

TABLE 5-continued

Polymerization of HECO-Comp

|  |  | HECO-Comp |
|---|---|---|
| Loop (R1) |  |  |
| Residence time | [h] | 0.9 |
| Temperature | [° C.] | 85 |
| H$_2$/C$_3$ ratio | [mol/kmol] | 0 |
| MFR | [g/10 min] | 0.1 |
| XCS | [wt %] | 2.0 |
| C2 content | [mol %] | 1.0 |
| split | [wt %] | 39 |
| 1$^{st}$ GPR (R2) |  |  |
| Residence time | [h] | 2.3 |
| Temperature | [° C.] | 90 |
| Pressure | [kPa] | 2301 |
| H$_2$/C$_3$ ratio | [mol/kmol] | 18 |
| MFR | [g/10 min] | 0.5 |
| XCS | [wt %] | 0 |
| C2 content | [mol %] | 0.6 |
| split | [wt %] | 48 |
| 2$^{nd}$ GPR (R3) |  |  |
| Residence time | [h] | 0.7 |
| Temperature | [° C.] | 70 |
| Pressure | [kPa] | 1701 |
| H$_2$/C$_2$ ratio | [mol/kmol] | 40 |
| MFR | [g/10 min] | 0.45 |
| XCS | [wt %] | 14 |
| C2 content | [mol %] | 7 |
| split | [wt %] | 13 |

TABLE 6

Properties of HECO-Comp

|  |  | HECO-Comp |
|---|---|---|
| H-PP1 (R1 + R2) |  |  |
| MFR | [g/10 min] | 0.5 |
| XCS | [wt %] | 0 |
| C2 content | [mol %] | 1.0 |
| split | [wt %] | 87 |
| ESC1 (R3) |  |  |
| split | [wt %] | 13 |
| HECO-Comp (final) |  |  |
| MFR | [g/10 min] | 0.45 |
| C2 content | [mol %] | 7 |
| XCS | [wt %] | 14 |
| C2 content of XCS | [mol %] | 7.5 |
| IV of XCS | [dl/g] | 4.1 |

Preparation of mHECO and mHECO-Comp

To HECO1 and HECO-Comp, respectively 0.6 wt.-% of Trigonox BPIC 37.5PP-PD (AKZO NOBEL Polymer Chemicals BV, NL) were dosed in the main hopper of a twin screw extruder Mega Compounder ZSK 18 (screw length 40 D) with a temperature profile 20/190/220/225/230/230/210/200° C. and a screw speed of 300 rpm. After heating and melting of the polymer mixture (zones 1, 2 and 3), 2.5 wt.-% of component D (Accurel PA104 Membrana GmbH, DE) were added into the polymer melt (zone 4) via a side feeder. The polymer melt mixture was passed through the extruder, then to intensive devolatilisation, discharged and pelletised.

Trigonox BPIC 37.5PP (tert-butylperoxy isopropyl carbonate, absorbed in PP pellets, supplied by Membrana, D).

Accurel PA104: The coupling agent used is low molecular weight liquid polybutadiene having a Mw of 1800 g/mol with very high vinyl content (45-55%, supplied from Synthomer, UK) which is absorbed into highly porous PP-carrier (supplied from Membrana, Del.).

TABLE 7

Properties of mHECO and mHECO-Comp

|  |  | mHECO | mHECO-Comp |
|---|---|---|---|
| MFR$_2$ | [g/10 min] | 35 | 36 |
| XCS | [wt %] | 24 | 7.5 |
| XHI | [wt %] | 0.23 | 0.42 |
| C2 content | [mol %] | 18 | 7 |
| IV of XCS | [dl/g] | 2.1 | 1.4 |
| D | [wt.-%] | 1.25 | 1.25 |

D is the polybutadiene

The inventive and comparative compositions were melt blended on a co-rotating twin screw extruder.

TABLE 8a

Properties of comperative compositions

|  |  | CE1 | CE2 | CE3 | CE4 |
|---|---|---|---|---|---|
| HECO | [wt.-%] | — | 85 | 76.5 | — |
| HECO1 | [wt.-%] | 85 | — | — | 76.5 |
| mHECO-Comp | [wt.-%] | — | — | 10 | 10 |
| Talc | [wt.-%] | 15 | 15 | 13.5 | 13.5 |
| TM | [MPa] | 1576 | 1599 | 1666 | 1591 |
| IS (23° C.) | [kJ/m$^2$] | 49 | 23 | 37 | 52 |
| IS (−20° C.) | [kJ/m$^2$] | 6.8 | 4.3 | 4.7 | 7.5 |
| MSE1 | [-] | 37 | 56 | 48 | 45 |

TABLE 8b

Properties of inventive compositions

|  |  | IE1 | IE2 | IE3 | IE4 |
|---|---|---|---|---|---|
| HECO | [wt.-%] | 76.5 | 72.3 | 68 | — |
| HECO1 | [wt.-%] | — | — | — | 68 |
| mHECO | [wt.-%] | 10 | 15 | 20 | 20 |
| Talc | [wt.-%] | 13.5 | 12.7 | 12 | 12 |
| TM | [MPa] | 1615 | 1518 | 1487 | 1418 |
| IS (23° C.) | [kJ/m$^2$] | 46 | 40 | 44 | 54 |
| IS (−20° C.) | [kJ/m$^2$] | 6.5 | 6.1 | 6.6 | 8.4 |
| MSE1 | [-] | 30 | 21 | 17 | 28 |

Talc: The commercial product Steamic T1CA of Luzenac was used as talc component in the test compositions.

What is claimed is:

1. A composition comprising
   (a) a heterophasic composition (HECO) comprising a comonomer selected from ethylene and/or C$_4$ to C$_{12}$ alpha-olefin comprising
      (a1) a (semi)crystalline polypropylene (PP) and
      (a2) an elastomeric propylene copolymer (ESC) dispersed in said (semi)crystalline polypropylene (PP);
   (b) an inorganic filler (F), and
   (c) a modified heterophasic composition (mHECO) comprising a comonomer selected from ethylene and/or C$_4$ to C$_{12}$ alpha-olefin comprising
      (c1) a (semi)crystalline polypropylene (mPP);
      (c2) an elastomeric propylene copolymer (mESC) dispersed in said (semi)crystalline polypropylene (mPP);
      (c3) at least one of units (D) derived from bifunctionally unsaturated monomer(s) (D') selected from the group consisting of divinyl compounds, allyl compounds, and dienes, or multifunctionally unsaturated low molecular weight polymer (D") being a polybutadiene or a copolymer of polybutadiene and styrene having 1,2-(vinyl) in the polymer chain and having a number average molecular weight (Mn) of equal or below 10000 g/mol, (c4) a xylene cold soluble fraction (XCS) in the range of 15 to 30 wt.-%; and (c5) a gel content of below 1.0 wt. %;

wherein the heterophasic composition (HECO) is different from the modified heterophasic composition (mHECO), and the heterophasic composition (HECO), the inorganic filler (F), and the modified heterophasic composition (mHECO) make up together at least 90 wt.-%, based on a total weight of the composition.

2. The composition according to claim 1, wherein the xylene cold soluble fraction (XCS) of the modified heterophasic composition (mHECO) has an intrinsic viscosity (IV) in the range of 1.5 to 2.6 dl/g.

3. The composition according to claim 1, wherein the modified heterophasic composition (mHECO) has a melt flow rate $MFR_2$ (230° C.) measured according to ISO 1133 from 20 to 50 g/10 min.

4. The composition according to claim 1, wherein the modified heterophasic composition (mHECO) comprises at least one of:

(a) a comonomer content of ethylene and/or $C_4$ to $C_{12}$ alpha-olefin in the range of 12 to 28 mol-%;

or (b) at least 0.1 wt.-% of units (D).

5. The composition according to claim 1, wherein (a) the bifunctionally unsaturated monomers (D') used for the units (D) are selected from the group consisting of 1,3-butadiene, isoprene, dimethylbutadiene, and divinylbenzene;

or (b) the multifunctionally unsaturated low molecular weight polymer (D") is a polybutadiene having a number average molecular weight (Mn) of equal or below 10000 g/mol;

or (c) both (a) and (b).

6. The composition according to claim 1, wherein the heterophasic composition (HECO) has at least one of:

(a) a comonomer content of ethylene and/or $C_4$ to $C_{12}$ alpha-olefin, based on the total weight of the heterophasic composition (HECO), in the range of 10 to 30 mol-%;

or (b) a xylene cold soluble fraction (XCS) in the range of 20 to 45 wt.-%;

or (c) a melt flow rate $MFR_2$ (230° C.) measured according to ISO 1133 from 5 to 30 g/10 min.

7. The composition according to claim 1, wherein a xylene cold soluble fraction (XCS) of the heterophasic composition (HECO) has (a) an intrinsic viscosity (IV) in the range of 1.5 to 4.5 dl/g;

(b) a comonomer content of ethylene and/or $C_4$ to $C_{12}$ alpha-olefin, based on the total weight of the xylene cold soluble fraction (XCS) of the heterophasic composition (HECO), in the range of 30 to 60 mol-%.

8. The composition according to claim 1, wherein a xylene insoluble fraction (XCI) of the heterophasic composition (HECO) has an intrinsic viscosity (IV) in the range of 0.8 to 1.8 dl/g.

9. The composition according to claim 1, wherein the difference of the intrinsic viscosity (IV) of a xylene insoluble fraction (XCI) of the heterophasic composition (HECO) to the intrinsic viscosity (IV) of a xylene cold soluble fraction (XCS) of the heterophasic composition (HECO) is in the range of 0.5 to 5.8.

10. The composition according to claim 1, wherein the inorganic filler (F) is talc.

11. The composition according to claim 1, wherein the composition comprises (a) 45 to 85 wt.-%, based on the total weight of the composition, of the heterophasic composition (HECO);

(b) 5 to 25 wt.-%, based on the total weight of the composition, of the inorganic filler (F); and (c) 5 to 30 wt.-%, based on the total weight of the composition, of the modified heterophasic composition (mHECO).

12. An article comprising the composition according to claim 1.

13. The article according to claim 12 being an automotive article.

14. A process comprising: reducing tigerskin of a composition with the modified heterophasic composition (mHECO) defined in claim 1, wherein the composition comprises a modified heterophasic composition (mHECO) and the heterophasic composition (HECO) as defined in claim 1.

15. The process according to claim 14, wherein the composition comprises at least one of:

(b) talc as the additional inorganic filler (F);

or (c) (c1), (c2), and (c3) wherein:

(c1) 45 to 85 wt.-%, based on the total weight of the composition, of the heterophasic composition (HECO);

(c2) 5 to 25 wt.-%, based on the total weight of the composition, of the inorganic filler (F); and (c3) 5 to 30 wt.-%, based on the total weight of the composition, of the modified heterophasic composition (mHECO).

* * * * *